United States Patent
Cui et al.

(10) Patent No.: US 11,538,368 B2
(45) Date of Patent: Dec. 27, 2022

(54) FLEXIBLE COVER PLATE, DISPLAY MODULE AND DISPLAY DEVICE

(71) Applicant: BOE TECHNOLOGY GROUP CO., LTD., Beijing (CN)

(72) Inventors: Yue Cui, Beijing (CN); Tao Wang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 118 days.

(21) Appl. No.: 16/998,087

(22) Filed: Aug. 20, 2020

(65) Prior Publication Data

US 2021/0150943 A1    May 20, 2021

(30) Foreign Application Priority Data

Nov. 18, 2019 (CN) .......................... 201911128463.5

(51) Int. Cl.
*G09F 9/30* (2006.01)
*B32B 27/00* (2006.01)
*B32B 27/08* (2006.01)
*G06F 1/16* (2006.01)

(52) U.S. Cl.
CPC .............. *G09F 9/301* (2013.01); *B32B 27/00* (2013.01); *B32B 27/08* (2013.01); *G06F 1/1652* (2013.01)

(58) Field of Classification Search
None
See application file for complete search history.

(56) References Cited

U.S. PATENT DOCUMENTS

2016/0320803 A1 * 11/2016 Oh .......................... B32B 27/36
2020/0201090 A1 * 6/2020 Chen ..................... G02F 1/1335

FOREIGN PATENT DOCUMENTS

| CN | 106095153 A | 11/2016 |
| CN | 106967296 A | 7/2017 |
| CN | 108341962 A | 7/2018 |
| CN | 108877529 A | 11/2018 |
| CN | 208444535 U | 1/2019 |
| JP | 2007121578 A | 5/2007 |

OTHER PUBLICATIONS

First Office Action for CN Patent Application No. 201911128463.5 dated Mar. 25, 2021.
Yanagisawa Y, Nan Y, Okura K, Aida T. Mechanically robust, readily repairable polymers via tailored noncovalent cross-linking. Science. Jan. 5, 2018;359(6371):72-76.

* cited by examiner

*Primary Examiner* — Ramsey Zacharia
(74) *Attorney, Agent, or Firm* — Xsensus LLP

(57) ABSTRACT

A flexible cover plate is described that includes a base layer, a hard coating layer, on the base layer and a cover layer on a side of the hard coating layer away from the base layer. The cover layer is made of a linear organic polymer having a hydrogen bond crosslink network.

15 Claims, 1 Drawing Sheet

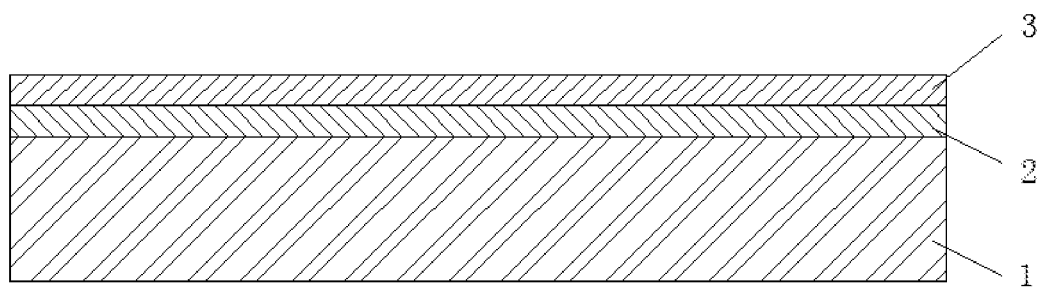

FLEXIBLE COVER PLATE, DISPLAY MODULE AND DISPLAY DEVICE

CROSS REFERENCE TO RELATED APPLICATION

This application is based upon and claims priority to Chinese Patent Application No. 201911128463.5, filed on Nov. 18, 2019, where the entire contents thereof are incorporated herein by reference.

TECHNICAL FIELD

The present disclosure relates to the technical field of displays and, in particular, to a flexible cover plate, a display module, and a display device.

BACKGROUND

With the development of various display techniques, the requirements for various performance of a screen are increasing due to wide use of display devices. As flexible screens have bendable and rolling characteristics, it is possible to bend, fold, or roll the display device, so as to bring convenience of carrying and using the display device. Wearable display devices with flexible display panels are popular, show great potential in entertainment and other fields, and thus have been listed into the main competitive market in the industry.

SUMMARY

In an aspect of the present disclosure, an embodiment of this disclosure provides a flexible cover plate that includes a base layer, a hard coating layer, and a cover layer. The hard coating layer is arranged on the base layer. The cover layer is laminated on a side of the hard coating layer away from the base layer. The cover layer is made of a linear organic polymer having a hydrogen bond crosslink network.

According to one embodiment of the present disclosure, the cover layer is made of an ether-thiourea linear polymer.

According to one embodiment of the present disclosure, a thickness of the cover layer is 5-20 μm.

According to one embodiment of the present disclosure, the cover layer is a single-layer film structure, or the cover layer is a multi-layer film structure in which at least two layers of films are laminated.

According to one embodiment of the present disclosure, the flexible cover plate comprises a display area and a non-display area surrounding the display area, and the cover layer at least covers the display area.

According to one embodiment of the present disclosure, the base layer is made of one or more materials selected from polyimide, polyethylene and polymethyl methacrylate, or the base layer is made of a flexible glass material.

According to one embodiment of the present disclosure, the hard coating layer is made of an acrylate material.

According to one embodiment of the present disclosure, a thickness of the flexible cover plate is not more than 200 μm.

In another aspect, an embodiment of the present disclosure provides a display module, which includes the flexible cover plate mentioned above.

In another aspect, an embodiment of the present disclosure provides a display device, which includes the display module mentioned above.

BRIEF DESCRIPTION OF THE DRAWINGS

FIG. 1 is a schematic structural view of a flexible cover plate provided by an embodiment of the present disclosure.

DETAILED DESCRIPTION

In order to further explain the technical means adopted to achieve the intended purpose and its effects, a flexible cover plate, a display module, and a display device are proposed according to the present disclosure, and specific implementations, structures, characteristics, and effects thereof will be described in detail below with reference to the drawing and various embodiments.

A flexible cover plate generally serves as a protective structure of the surface layer of the flexible display module. Currently, the flexible cover plate is usually made of polymer materials such as PI and PET, which have poor strength and impact resistance, so that display failure of a display screen occurs under the impact of heavy objects, for example a ball or a pen falls down, because cracks are generated on a film layer at a position where a pen tip or a ball body falls down, and abnormity such as pits and black spots are presented at the position where the pen tip or the ball body falls down.

An embodiment of the present disclosure provides a flexible cover plate, a display module, and a display device, generally to solve such problem that the flexible cover plate has poor impact resistance and easily affects display of the display module in the prior art.

As shown in FIG. 1, a flexible cover plate as proposed in the present disclosure includes a base layer 1, a hard coating layer 2, and a cover layer 3.

The hard coating layer 2 is arranged on the base layer 1.

The cover layer 3 is provided on a side of the hard coating layer away from the base layer, where the cover layer is made of a linear organic polymer having a hydrogen bond crosslink network.

For example, the flexible cover plate plays a supporting role as a surface structure of the display module and also is required to protect a polarizer, an elastic support layer, and a display device under the flexible cover plate from being damaged, so that the flexible cover plate is allowed to have sufficient strength and impact resistance. The flexible cover plate proposed in this embodiment includes three layers structures laminated. A base layer 1 is positioned on the bottom of the flexible cover plate as the flexible base. The material of the base layer 1 may be one or more of polyimide, polyethylene, and polymethyl methacrylate. The base layer 1 made of polymer organic materials can meet the requirements for bending or rolling the flexible cover plate because of its good bending performance. Alternatively, the material of the base layer 1 may also be made of flexible glasses having rigid characteristics, so that the flexible cover layer has some strength and some bending performance, that is to say, the base layer 1 made of the flexible glass material can have better bending performance and strength. The hard coating layer 2 is laminated on the base layer 1 to form a film layer by a coating process, and the thickness of the hard coating layer 2 may be 5-15 such as 5 μm, 8 μm, 10 μm, 12 μm, 14 μm, and the like. In this embodiment, an advantage having flexibility and rigidity can be achieved by arranging the hard coating layer 2 on the surface of the base layer 1 of the flexible glass. For example, the hard coating layer 2 may be made of acrylate materials, and may be coated on the surface of the base layer 1. Since the acrylate material may be cross-linked and cured under ultraviolet (UV) radiation or by heating, the cured products may have rigidity and flexibility, so that the acrylate material is adapted to be used as the hard coating layer 2.

The flexible cover plate that is formed by laminating the base layer 1 and the hard coating layer 2 has a certain rigidity and flexibility, and thereby having a good bending performance. A display failure is caused under the impact of heavy objects, for example a ball or a pen falls down, because cracks are generated on a film layer at a position where a pen tip or a ball body falls down, and abnormities, such as pits and black spots, are presented at the position where the pen tip or the ball body falls down, so that a normal display of the display module is affected. In order to further solve the problem of poor impact resistance of the flexible cover plate, in this embodiment, the hard coating layer 2 is provided with a cover layer 3 which is made of a linear organic polymer and in which a hydrogen bond crosslink network is formed. When low molecular weight organic polymers are crosslinked by dense hydrogen bonds, although they possess extremely slow diffusion kinetics, materials with high mechanical strength are easy to be repaired and can be produced. A high mechanical strength and stable repair ability can be realized, and furthermore the impact resistance of the flexible cover plate can be improved through interaction of the hydrogen bonds among various monomers in a low molecular weight organic polymer matrix. The above-mentioned stable repairability depends on an extrinsic or intrinsic repair behavior of a linear organic polymer, and an external healing ability depends on small capsules or blood vessel network which are finely dispersed inside thereof. The polymer materials are embedded under the monomer broken when being mixed and an initiator, and can be connected with the breakage to form a new polymer chain, so that self-repair function can be realized. Such repairable polymer materials are normally soft and deformable to meet the bending performance requirements of flexible cover plate. Through such design that the hydrogen bonds are interacted with one another and cross-linked with dynamic covalent bonds, the polymer materials can be self-repaired after the temperature or the pressure is increased, for example, the values of the temperature or the pressure may be determined according to the actual situations and the types of the linear organic polymers, that is, the damaged portion of the flexible cover plate can be repaired through operation of rising the temperature or the pressure locally at the fixed point thereof so as to improve the yield of the products when the surface of the flexible cover plate is damaged at a stage from manufacturing the products to transporting the products out of the factory.

The impact resistance of the flexible cover plate can be improved via the hydrogen bond crosslink network inside the materials of the cover layer 3, since the thickness of the cover layer 3 when being specifically arranged may be set to about 5-20 μm, such as 6 μm, 8 μm, 10 μm, 12 μm, 14 μm, 15 μm, 17 μm, 18 μm, etc., it is not necessary to increase the overall thickness of the flexible cover plate to improve the strength and impact resistance of the flexible cover plate, so that it is beneficial to design the flexible cover plate thinner and not affect the bending performance of the flexible cover plate when the strength and impact resistance are increased.

An embodiment of the present disclosure provides a flexible cover plate, which is formed by laminating three layers structures. A base layer is positioned on the bottom of the flexible cover plate as the flexible base, and a hard coating layer is arranged on the upper side of the base layer to achieve the effect having flexibility and rigidity. In order to enhance the impact resistance of the flexible cover plate, a cover layer is arranged on the surface of the hard coating layer and is made of a linear organic polymer having a hydrogen bond crosslink network. A high mechanical strength and stable repair ability can be realized, and furthermore, the impact resistance of the flexible cover plate can be improved without increasing the thickness of the flexible cover plate to ensure the bending performance thereof through interaction of the hydrogen bonds among various monomers in a low molecular weight organic polymer matrix. The portion locally damaged on the surface of the cover layer can be repaired through operation of rising the temperature or the pressure locally so as to improve the yield of the products before the flexible cover plates are transported out of the factory.

The cover layer 3 is made of the linear organic polymer, in which the hydrogen bond crosslink network is formed. For example, the cover layer 3 may be made of the ether-thiourea linear polymer, which is one of the linear organic polymers, in which the hydrogen bond network can be formed. A zigzag hydrogen bond array is abnormally formed by using thiourea monomer, which cannot cause unfavorable crystallization and allows the presentation of a thiourea unit with the hydrogen bond. The monomer in the organic polymer matrix can activate exchange of the hydrogen bonds. The high mechanical strength and stable repair capability are achieved by the dense crosslink of the hydrogen bonds. For example, the manufacturing method of the cover layer 3 is coating the ether-thiourea linear polymer material on the hard coating layer 2 to form a thin film with a preset thickness. The Ether-thiourea linear polymer, for example has following forms:

① an ether-thiourea linear polymer with diethylene glycol (TUEG 2), triethylene glycol (TUEG 3) and tetraethylene glycol (TUEG 4) as a space group, the chemical formula is as follows:

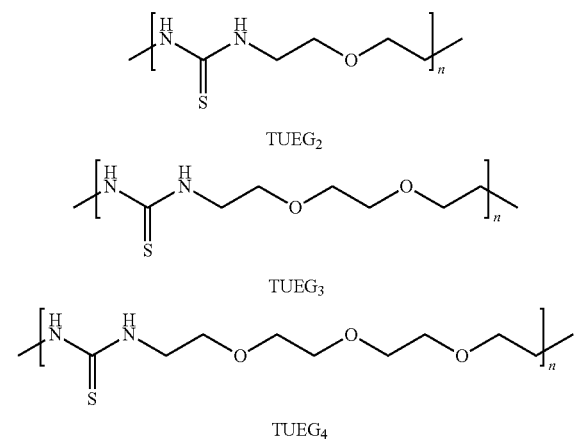

② an ether-urea linear polymer with triethylene glycol (LEG 3) as a space group, the chemical formula is as follows:

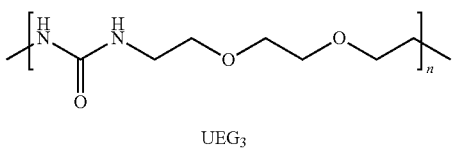

In order to improve the impact resistance of the flexible cover plate, the main method adopted includes: increasing the thickness of the polymer layer, or adopting a film structure composed of two or more polymer layers, and connecting adjacent polymer layers by coating an optical adhesive to form an integrated structure. Through use of these methods, the improvement of the impact resistance of the flexible cover plate is limited, but the overall thickness of the flexible cover plate can be increased greatly and thereby affecting the bending performance of the flexible cover plate. The flexible cover plate proposed in this embodiment includes the cover layer 3 located at the top layer. The cover layer is made of the linear organic polymer material, in which the monomers are cross-linked by the dense hydrogen bonds, so as to obtain a higher strength and impact resistance, and the material itself has better impact resistance, so that there is no need to increase the thickness in order to enhance the strength and impact resistance. The cover layer 3 in the specific use is a thin film layer covering the surface of the hard coating layer 2. The thickness of the cover layer 3 may be 5-20 μm. Now, the overall thickness of the flexible cover plate is more than 200 μm, so that the thickness of the cover layer 3 is smaller relative to the overall thickness of the flexible cover plate, and the bending performance of the flexible cover plate cannot be affected. Furthermore, the cover layer may be a single-layer film structure, or a multi-layer film structure formed by at least two films laminated.

The flexible cover includes a display area and a non-display area surrounding the display area. After the flexible cover is applied to the display module, a display device is correspondingly arranged on the lower side of the display area of the flexible cover, to realize the display function. This embodiment is not limited to the specific configuration of the display device layer, for example, the display device may include an OLED layer, a touch panel, a polarizer and other structures. In order to avoid affecting the normal display effect of the display module and protect the display device layer from being damaged, a coverage area of the cover layer 3 may be set to at least cover the display area, or may also cover the whole area of the flexible cover plate.

For example, the base layer 1 may be made of various materials, such as polyimide, polyethylene and polymethyl methacrylate. The base layer 1 made of the polymer organic materials has better bending performance and can meet the requirements for bending and rolling the flexible cover plate, alternatively the material of the base layer 1 may also be made of a flexible glass, which has the rigidity characteristics of glass materials to make it have a certain strength, and also has a certain bending performance, so that the base layer 1 made of the flexible glass can have better bending performance and a certain rigidity.

For example, an effect having flexibility and rigidity can be achieved by arranging the hard coating layer 2 on the base layer 1. The hard coating layer 2 may be made of an acrylate material, for example, may be coated on the surface of the base layer 1. Since the acrylate material may be cross-linked and cured under ultraviolet (UV) radiation or by heating, the cured products may have rigidity and flexibility, so that the acrylate material is adapted to be used as the hard coating layer 2, which however is not limited thereto.

In order not to affect the bending performance of the flexible cover plate, the overall thickness of the flexible cover plate may be reduced as much as possible under the condition of that its strength and impact resistance can meet the requirements. The base layer 1 used as the flexible base of the cover plate plays a supporting role, and has a thickness that is much greater than that of the hard coating layer 2 and the cover layer 3. The thickness of base layer 1 may be 50-150 μm, such as 60 μm, 70 μm, 80 μm, 90 μm, 100 μm, 110 μm, 120 μm, 130 μm, 140 μm, etc. The thickness of cover layer 3 may be 5-20 μm, and the thickness of hard coating layer 2 may be equal to or slightly smaller than that of the cover layer 3. The thickness of the hard coating layer 2 may be about 5-15 μm, and the overall thickness of the flexible cover plate may be made to be not more than 200 μm, so as to have a better bending performance and thus can be applied to the flexible module.

The present disclosure provides a display module including the flexible cover plate according to the present disclosure.

For example, the display module may include a base substrate disposed at the bottom and a display device layer disposed between the base substrate and the flexible cover plate. The arrangement of the flexible cover plate can bring a better support and reliable protection for the display device layer, so as to avoid the display device layer from being damaged.

An embodiment of the present disclosure provides a display module. By using the flexible cover plate composed of a base layer 1, a hard coating layer 2, and a cover layer 3, the surface strength and the impact resistance of the display module can be improved, thereby improving the display effect of the display module, meeting the lightweight design requirements of the display module, and ensuring a better bending performance of the display module.

The present disclosure provides a display device including the display module according to the present disclosure.

For example, the display device may be an electronic device, such as a mobile phone, a tablet, a computer and the like, with a display function. The above display module is used in the display device to realize the display function.

An embodiment of the present disclosure provides a display device, in which a thin and light display module having strong impact resistance is used to improve the display effect of electronic equipment, and facilitate reducing the overall thickness of the display device and improve the bending performance of the display device.

It should be noted that orientation or position relationship as indicated by the terms "upper" and "lower" is orientation or position relationship as shown in the drawings according to the description of this specification, only for the convenience of describing this disclosure and simplifying the description, but not for indicating or suggesting that the referred device or element must have a specific orientation, constructed and operated in a specific orientation, so that it cannot be understood as limiting the present disclosure. The terms "connect", "install" and "fix" should be understood in a broader sense, for example, "connect" may be a fixed connection, a detachable connection or an integral connection, or being connected directly or being connected indirectly through an intermediate medium. For those skilled in the art, the specific meanings of the above terms in this disclosure should be understood according to specific situations.

According to the description of this specification, the description of the terms "an embodiment", "some embodiments", "specific embodiments", etc. is intended to mean that specific features, structures, materials, or characteristics described in connection with this embodiment or example are included in at least one embodiment or example of the present disclosure. In this specification, the illustrations of the above terms do not necessarily refer to the same embodiments or examples. Furthermore, the specific features, structures, materials or characteristics may be combined in any one or more embodiments or examples in a suitable manner.

The above described are merely the specific embodiments of the present disclosure, but the present disclosure is not limited thereto. Any variation or substitution can be easily envisaged by those skilled in the art and can be embraced within the present disclosure. It is intended that the scope of the invention only be limited by the appended claims.

What is claimed is:

1. A flexible cover plate comprising a display area and a non-display area surrounding the display area, and further comprising:
    a base layer;
    a hard coating layer on the base layer; and
    a cover layer on a side of the hard coating layer away from the base layer;
    wherein the cover layer is made of a linear organic polymer having a hydrogen bond crosslink network, a thickness of the cover layer is 5 μm, the cover layer is a multi-layer film structure in which at least two layers of films are laminated, and the cover layer at least covers the display area.

2. The flexible cover plate according to claim 1, wherein the cover layer is made of an ether-thiourea linear polymer.

3. The flexible cover plate according to claim 1, wherein the base layer is made of at least one of: polyimide, polyethylene, and polymethyl methacrylate, or the base layer is made of a flexible glass material.

4. The flexible cover plate according to claim 1, wherein the hard coating layer is made of an acrylate material.

5. The flexible cover plate according to claim 1, wherein a thickness of the flexible cover plate is not more than 200 μm.

6. A display module comprising a display area and a non-display area surrounding the display area, and further comprising a flexible cover plate, wherein the flexible cover plate comprises:
    a base layer;
    a hard coating layer on the base layer; and
    a cover layer on a side of the hard coating layer away from the base layer;
    wherein the cover layer is made of a linear organic polymer having a hydrogen bond crosslink network, a thickness of the cover layer is 5 μm, the cover layer is a multi-layer film structure in which at least two layers of films are laminated, and the cover layer at least covers the display area.

7. The display module according to claim 6, wherein the cover layer is made of an ether-thiourea linear polymer.

8. The display module according to claim 6, wherein the base layer is made of at least one material selected from polyimide, polyethylene, and polymethyl methacrylate, or the base layer is made of a flexible glass material.

9. The display module according to claim 6, wherein the hard coating layer is made of an acrylate material.

10. The display module according to claim 6, wherein a thickness of the display module is not more than 200 μm.

11. A display device, comprising:
    a display module comprising a display area and a non-display area surrounding the display area, and further comprising a flexible cover plate, the flexible cover plate comprising:
    a base layer;
    a hard coating layer on the base layer; and
    a cover layer on a side of the hard coating layer away from the base layer;
    wherein the cover layer is made of a linear organic polymer having a hydrogen bond crosslink network, a thickness of the cover layer is 5 μm, the cover layer is a multi-layer film structure in which at least two layers of films are laminated, and the cover layer at least covers the display area.

12. The display device of claim 11, wherein the cover layer is made of an ether-thiourea linear polymer.

13. The display device of claim 11, wherein the base layer is made of at least one of: polyimide, polyethylene, and polymethyl methacrylate, or the base layer is made of a flexible glass material.

14. He display device of claim 11, wherein the hard coating layer is made of an acrylate material.

15. The display device of claim 11, wherein a thickness of the flexible cover plate is not more than 200 μm.

* * * * *